United States Patent
Kawarada (10) Patent No.: US 9,232,131 B2
(45) Date of Patent: Jan. 5, 2016

(54) IMAGE CAPTURING APPARATUS AND IMAGE CAPTURING METHOD

(71) Applicant: CANON KABUSHIKI KAISHA, Tokyo (JP)

(72) Inventor: Masahiro Kawarada, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/295,209

(22) Filed: Jun. 3, 2014

(65) Prior Publication Data

US 2014/0362278 A1 Dec. 11, 2014

(30) Foreign Application Priority Data

Jun. 10, 2013 (JP) ................................. 2013-122102

(51) Int. Cl.
*H04N 5/232* (2006.01)

(52) U.S. Cl.
CPC ................................. *H04N 5/23212* (2013.01)

(58) Field of Classification Search
CPC ....................... H04N 5/23219; H04N 5/23212
See application file for complete search history.

(56) References Cited

U.S. PATENT DOCUMENTS

| 2008/0024620 | A1* | 1/2008 | Yoshida et al. | 348/222.1 |
| 2008/0284901 | A1* | 11/2008 | Misawa | 348/349 |
| 2009/0147107 | A1* | 6/2009 | Kawahara et al. | 348/240.2 |

FOREIGN PATENT DOCUMENTS

| JP | 4536248 B2 | 9/2010 |
| JP | 4974812 B2 | 7/2012 |

* cited by examiner

*Primary Examiner* — James Hannett
(74) *Attorney, Agent, or Firm* — Canon USA, Inc. IP Division (57) ABSTRACT

An image capturing apparatus performs rough detection through high-speed focus detection targeting on a face contour portion and then performs focusing through high-precision focus detection targeting on a face-included portion set inside the face contour.

11 Claims, 9 Drawing Sheets

FOCUSING SPEED CONTROL INDEX

IMAGE CAPTURING APPARATUS AND IMAGE CAPTURING METHOD

BACKGROUND OF THE INVENTION

1. Field of the Invention

One disclosed aspect of the embodiments relates to an image capturing apparatus including a focus detection unit using a contrast evaluation value and an image capturing method.

2. Description of the Related Art

Japanese Patent No. 4,536,248 discusses a focus detection apparatus configured to detect a focal position while performing contrast evaluation on a plurality of predetermined focal point detection areas. The focus detection apparatus performs face detection and limits focal point detection areas according to the position of the detected face.

The focus detection apparatus discussed in Japanese Patent No. 4,536,248 has first and second focusing control modes. In the first focusing control mode, a human eye area is intensively and selectively set as a focal point detection area. In the second focusing control mode, the focus detection apparatus performs focus detection using autofocus (AF) control that is different from the first focusing control mode.

In the focus detection, first, for example, an image area such as a screen center is targeted as a focal point detection area, and focus control is performed on the image area in the second focusing control mode. Then, after the focus control is performed on an area near an focusing position, an eye area is targeted as a focal point detection area, and the focus control is performed on the eye area in the first focusing control mode, whereby the focus is controlled onto a final focusing position. By the foregoing operation, the face especially the eyes can be focused.

Further, Japanese Patent No. 4,974,812 discusses an image capturing apparatus that focuses on a specific object such as a face without being disturbed by a background subject. In Japanese Patent No. 4,974,812, there are first and second areas. In the first area, a focal point detection area is set to cover a contour of a specific object such as a face. In the second area, a focal point detection area that is smaller than the first area is set inside the contour of the specific object.

In each of the first and second areas, spatial frequency components of a plurality of bands in the focal point detection areas are detected. If a difference between the bands of the spatial frequency components detected in the first area is larger than that in the second area, there may be a possibility of perspective conflict, so that the range of focus movement for the focus detection is limited to be narrow. The foregoing operation is performed so that if a perspective conflict is detected between the specific object and the background subject, the range of focus movement for the focus detection is limited to be narrow enough to exclude the background, whereby the perspective conflict can be avoided.

In the case of the image capturing apparatus discussed in Japanese Patent No. 4,536,248, if the shooting distance is long, the size of a face sometimes becomes so small that an image of an eye area is shot in significantly small size. In this case, it is sometimes impossible to detect a sufficient contrast, which results in focus determination at a wrong focusing position when making a focus determination or makes the focusing impossible. This problem becomes especially conspicuous under the conditions such as backlight and overexposure/underexposure that make the contrast evaluation difficult.

In the image capturing apparatus discussed in Japanese Patent No. 4,974,812, a wide focal point detection area is set to cover a contour of a specific object such as a face. If the focal point detection area is set in such a way, the focal point detection area is likely to include subjects showing various exposure amounts such as a face and a background. As a result, the contrast of a main subject is not sufficiently obtained, making it impossible to detect a focal point with high precision.

SUMMARY OF THE INVENTION

One disclosed aspect of the embodiments is directed to providing an image capturing apparatus capable of detecting a focal point highly precisely when focal point detection is carried out using a contrast evaluation method, by targeting a face, while preventing focus determination at a wrong focusing position and suppressing a focusing failure, in the case where the face is present as a subject.

According to an aspect of the embodiments, an image capturing apparatus includes: a focal point adjusting unit configured to perform focal point adjustment based on a contrast evaluation value of a subject generated using an image signal output from an image sensor; a first area setting unit configured to set a first focal point detection area including a contour portion of the subject for use in focal point detection by use of the image signal output from the image sensor; and a second area setting unit configured to set a second focal point detection area including a portion inside a contour of the subject and excluding the contour portion. The focal point adjusting unit includes a mode in which after a first focal point adjustment process is carried out based on a contrast evaluation value of the first focal point detection area, a second focal point adjustment process is carried out based on a contrast evaluation value of the second focal point detection area.

Further features of the disclosure will become apparent from the following description of exemplary embodiments with reference to the attached drawings.

DESCRIPTION OF THE EMBODIMENTS

Various exemplary embodiments, features, and aspects of the disclosure will be described in detail below with reference to the drawings.

Figure 1:
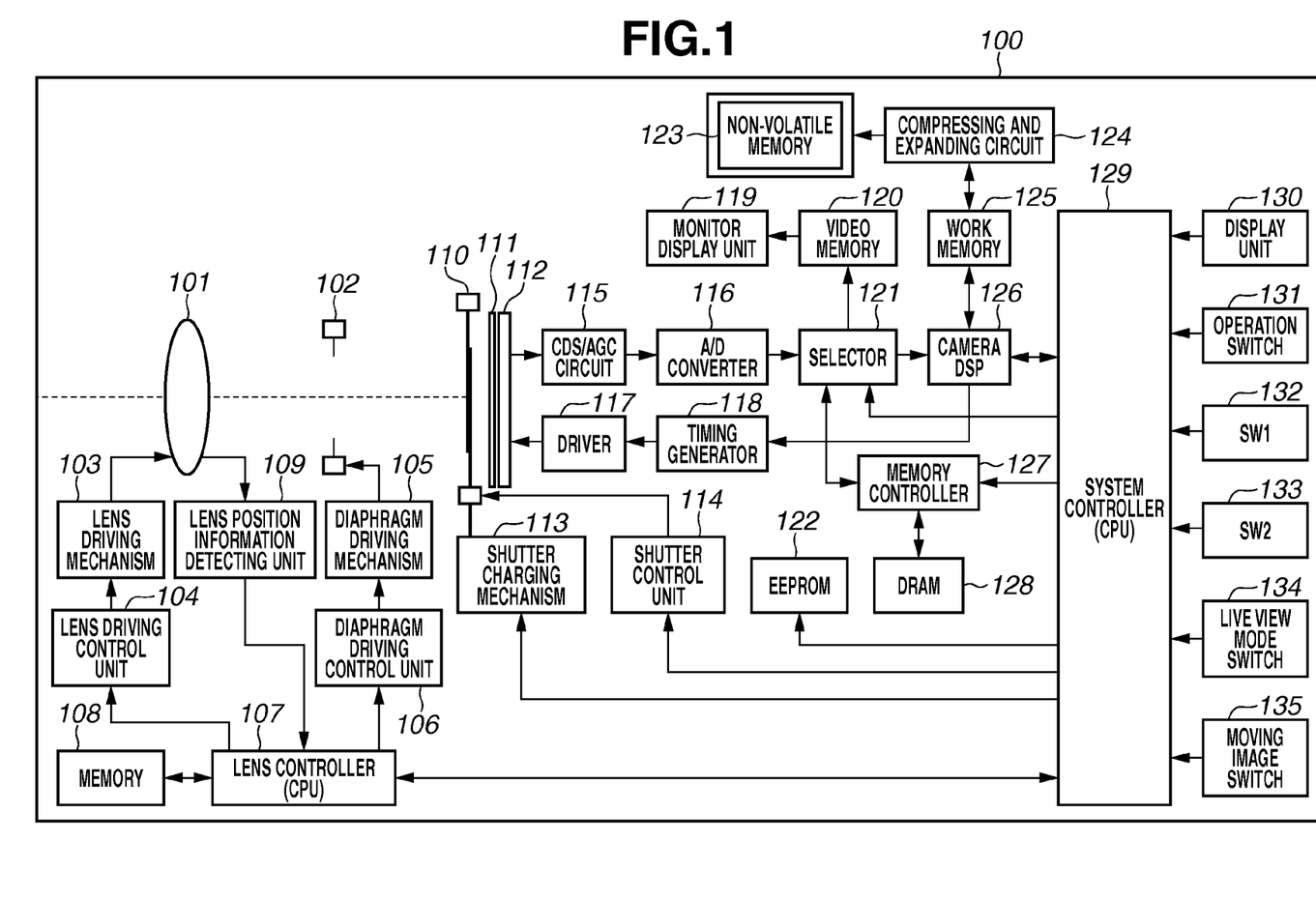
FIG. 1 is a block diagram illustrating the configuration of a digital camera according to a first exemplary embodiment.

FIG. 1 is a block diagram illustrating the configuration of a digital camera according to the first exemplary embodiment.

As illustrated in FIG. 1, a digital camera 100 includes a system controller 129 and a lens controller 107. The system controller 129 includes a central processing unit (CPU), a microprocessor unit (MPU), or the like and performs overall control. The lens controller 107 controls the entire optical system. When the system controller 129 and the lens controller 107 are in communication with each other, the system controller 129 sends a command to drive a focus lens 101, which is configured to form an image of a subject, a command to stop the focus lens 101, the amount of step driving, and the speed of step driving.

The system controller 129 also sends a request for transmission of the driving amount of a diaphragm 102 to control its opening, the driving speed of opening control, and various types of data about a lens. The diaphragm 102 is configured to adjust entering light rays. While FIG. 1 illustrates only a focus lens 101 among lenses included in the optical system, the optical system also includes other lenses that are not illustrated such as a zoom lens and a stationary lens.

The term "step driving" refers to intermittent driving of the focus lens based on pulse signals applied to a stepping motor.

In focus control, the system controller 129 sends to the lens controller 107 a command regarding the lens driving direction and the amount and speed of step driving. If the lens controller 107 receives a lens driving command from the system controller 129, the lens controller 107 controls a lens driving mechanism 103 through a lens driving control unit 104. The lens driving mechanism 103 includes the stepping motor as a driving source and drives the lens 101 along an optical axis.

The focal position of the lens 101 is sent to the lens controller 107 via a lens position information detecting unit 109, which includes a pulse encoder or the like that is configured to detect the number of rotation pulses of the motor included in the lens driving mechanism 103. The output is connected to a hardware counter, which is not illustrated, in the lens controller 107, and if the lens is driven, the hardware counter counts position information about the lens, as a hardware device. When the lens controller 107 reads the lens position, the lens controller 107 accesses a register of the hardware counter in the lens controller 107 to read the stored counter value.

If the lens controller 107 receives a diaphragm control command from the system controller 129, the lens controller 107 controls a diaphragm driving mechanism 105, which is configured to drive the diaphragm 102, via a diaphragm driving control unit 106 to control the diaphragm 102 according to the received driving amount.

A memory 108 is connected to the lens controller 107. At least a part of the memory 108 is constituted of a non-volatile storage medium. The memory 108 stores performance information such as the focal length of a zoom lens that is not illustrated, a maximum aperture value of the diaphragm 102, and the settable diaphragm driving speed.

The entering light rays adjusted by the diaphragm 102 travels from an aperture of a focal plane shutter 110, which is a mechanical shutter, to an image sensor 112 via an optical filter 111. The optical filter 111 has a function to filter out infrared rays and guide visible light to the image sensor 112. The optical filter 111 also has a function as an optical low-pass filter.

The focal plane shutter 110 includes a leading shutter blade and a trailing shutter blade. The focal plane shutter 110 controls passing and blocking of incident light rays. A shutter control unit 114 controls traveling and driving of the leading shutter blade and the trailing shutter blade of the focal plane shutter 110 in response to a signal from the system controller 129. The leading shutter blade and the trailing shutter blade of the focal plane shutter 110 include a spring as a driving source, and the spring needs to be charged for a next operation after the shutter has travelled.

Thus, a shutter charging mechanism 113 charges the spring. Further, the system controller 129 stores in a non-volatile memory, which is not illustrated, a program chart that defines the relationship between the amount of exposure in the image sensor 112 and the charge accumulation time of the image sensor 112, exposure sensitivity, and aperture values. The amount of exposure in the image sensor 112 is obtained from outputs of predetermined photometry areas.

The image sensor 112 is controlled by an output from a driver 117 that is based on a signal from a timing generator 118. The driver 117 controls the horizontal driving and vertical driving of each pixel. The timing generator 118 determines the driving timing of the entire image capturing system. Then, the image sensor 112 photo-electrically converts a subject image to generate an image signal and outputs the image signal. The image signal output from the image sensor 112 is amplified by a correlated double sampling (CDS)/ automatic gain control (AGC) circuit 115 and then converted into a digital signal by an analog/digital (A/D) converter 116.

The digital signal output from the A/D converter 116 is output to a memory controller 127 via a selector 121, which selects an output destination of a digital signal to be output to a camera DSP 126 based on a signal from the system controller 129. Every digital signal input to the memory controller 127 is transferred to a dynamic random access memory (DRAM) 128, which is a frame memory.

The digital camera 100 transfers the result of transfer to the DRAM 128 periodically (for each frame) to a video memory 120 via the selector 121 in order to display a viewfinder on a monitor display unit 119.

The timing generator 118, the A/D converter 116, the video memory 120, and a work memory 125 as well as the system controller 129 are connected to the camera DSP 126. The A/D converter 116, the video memory 120, and the work memory 125 are connected to the camera DSP 126 via the selector 121.

At the time of shooting, a digital signal for one frame is read from the DRAM 128 in response to a control signal from the system controller 129, and the camera DSP 126 performs image processing on the digital signal. Then, the digital signal is temporarily stored in the work memory 125.

The data in the work memory 125 is compressed by a compressing and expanding circuit 124 based on a predetermined compression format, and the result is recorded on an external non-volatile memory 123. Generally, a removable recording medium such as a semiconductor memory card is used as the non-volatile memory 123. It is also possible to use any non-volatile recording medium such as a magnetic disk and an optical disk as the non-volatile memory 123.

An operation switch 131 connected to the system controller 129 is a group of input devices that a user operates to input various setting items of the digital camera 100. The operation switch 131 can include arbitrary input devices. A display unit 130 is a display device such as a liquid crystal panel, a light emitting diode (LED), and an organic electroluminescence (EL) panel. The display unit 130 displays an operational state of the digital camera 100 that is set or selected via a switch included in the operation switch 131.

A release switch SW1 (132) is turned on if a two-stage stroke release button included in the release switch SW1 (132) is half-pressed (first-stage pressing). When the release switch SW1 (132) is turned on, the system controller 129 starts shooting preparation operations such as light metering and focus detection. A release switch SW2 (133) is turned on if the release button is full-pressed (second-stage pressing).

When the release switch SW2 (133) is turned on, the system controller 129 starts shooting operations (charge accumulation and charge reading operation) for recording of still images.

Alive view mode switch 134 is a switch for controlling turn-on and turn-off of the viewfinder display (live view) on the monitor display unit 119. A moving image switch 135 is a switch for starting a repeat operation of charge accumulation and charge reading to acquire moving images.

When the digital camera 100 is turned on, the digital camera 100 is set to perform still image recording (hereinafter, the setting will be referred to as "still image mode"), which is the initial setting. If the moving image switch 135 is operated, the initial setting is changed to moving image recording setting (hereinafter, the setting will be referred to as "moving image mode"). If the moving image switch 135 is operated again in the moving image mode, the setting is returned to the still image mode.

Figure 2:
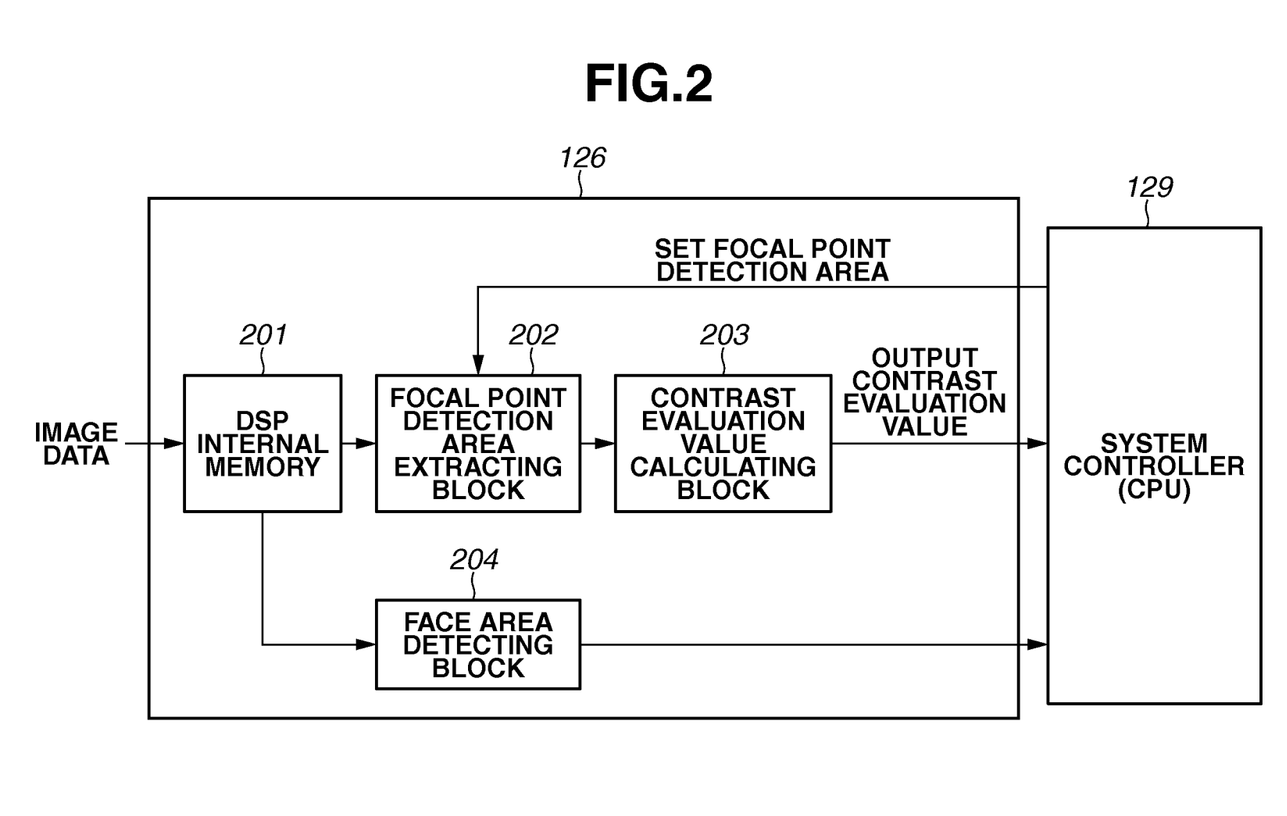
FIG. 2 is a functional block diagram illustrating a digital signal processor (DSP) in a camera.

The following describes circuit blocks in the camera DSP 126, with reference to FIG. 2.

As described above, the image signal generated by the image sensor 112 is amplified by the CDS/AGC circuit 115, converted into the digital signal by the A/D converter 116, and then input to the camera DSP 126 via the selector 121. The camera DSP 126 performs calculation of a contrast evaluation value for use in contrast AF and also performs face detection.

To calculate the contrast evaluation value, the image data input to the camera DSP 126 is first input into a focal point detection area extracting block 202 via a DSP internal memory 201 in the camera DSP 126. The focal point detection area extracting block 202 extracts a focal point detection area and nearby images near the focal point detection area from image data of the entire screen and supplies the extracted focal point detection area and the extracted nearby images to a contrast evaluation value calculating block 203. The area (size) of the focal point detection area is desirably about ⅕ to ⅒ when the size of the entire screen is 1.

The system controller 129 can set the position and area (size) of a focal point detection area in the screen, to the focal point detection area extracting block 202, which is an area setting unit. The contrast evaluation value calculating block 203 performs digital filter calculation on the focal point detection area and the nearby images to extract a predetermined spatial frequency component. The contrast evaluation value calculating block 203 outputs the extracted predetermined spatial frequency component as a contrast evaluation value to the system controller 129.

A face area detecting block 204 extracts a feature point of a face using a publicly-known technique from the image data of the entire screen that is input via the DSP internal memory 201, thereby detecting a face area. Information about the detected face area is output to the system controller 129.

The following describes the focal point detection areas.

Figure 3:
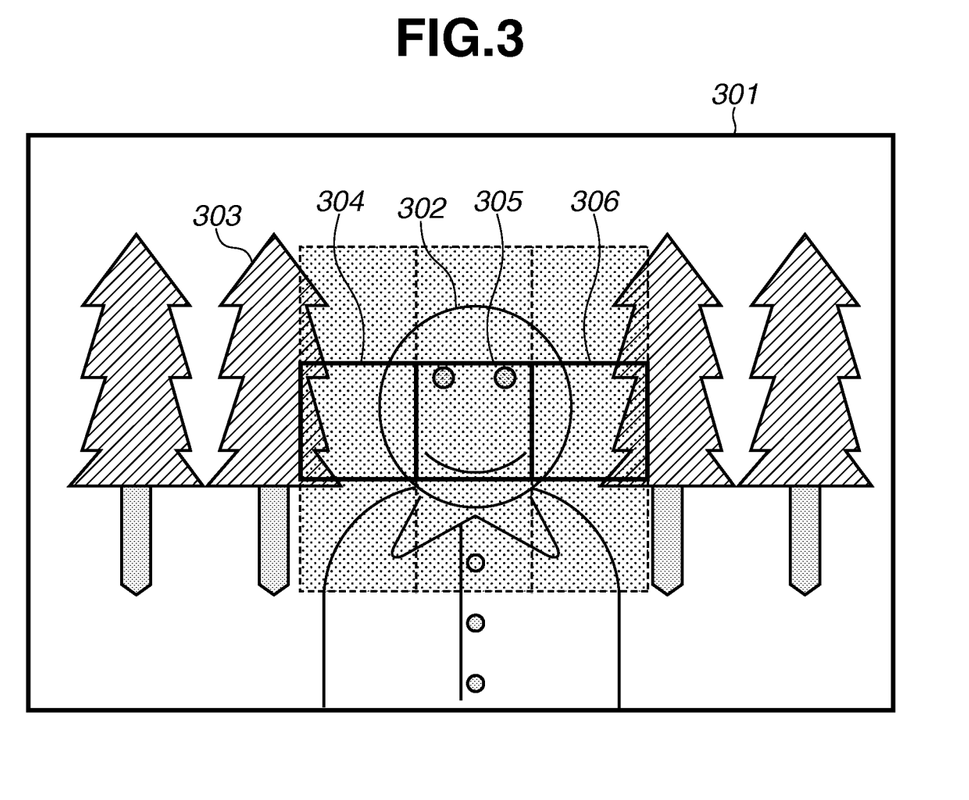
FIG. 3 is a diagram illustrating focal point detection areas.

FIG. 3 is a diagram illustrating focal point detection areas. In FIG. 3, a shooting composition 301 includes a human object 302, which is a main subject, background trees 303, and multiple focal point detection areas (pale halftone dot portion). In the multiple focal point detection areas, a focal point is independently detectable in nine areas constituted of three horizontal areas and three vertical areas. The position of the multiple focal point detection areas (pale halftone dot portion) with respect to the shooting composition 301 is fixed, and a focal point detection area that is to be focused ultimately is obtained through the focus detection operation of the digital camera 100.

In FIG. 3, each of the multiple focal point detection areas includes a part of the human object 302 or a part of the background trees 303. The multiple focal point detection areas (pale halftone dot portion) include focal point detection areas 304, 305, and 306. The focal point detection area 304 includes a left contour portion of the face of the human object 302. The focal point detection area 305 is inside the contour of the face. The focal point detection area 306 includes a right contour portion of the face.

According to the present exemplary embodiment, the focal point detection areas (304, 306) including the right and left contour portions of the face and the focal point detection area 305 inside the contour are selectively targeted in the focus detection operation, and autofocus control is performed based on the contrast evaluation results of the targeted focal point detection areas.

After the digital camera 100 is turned on to start capturing of subject images and a live view operation to display the results of the image capturing on the display unit 130, if the switch SW1 (131) is pressed, the contrast evaluation is performed on the total nine areas constituted of three horizontal areas and three vertical areas.

Figure 4:
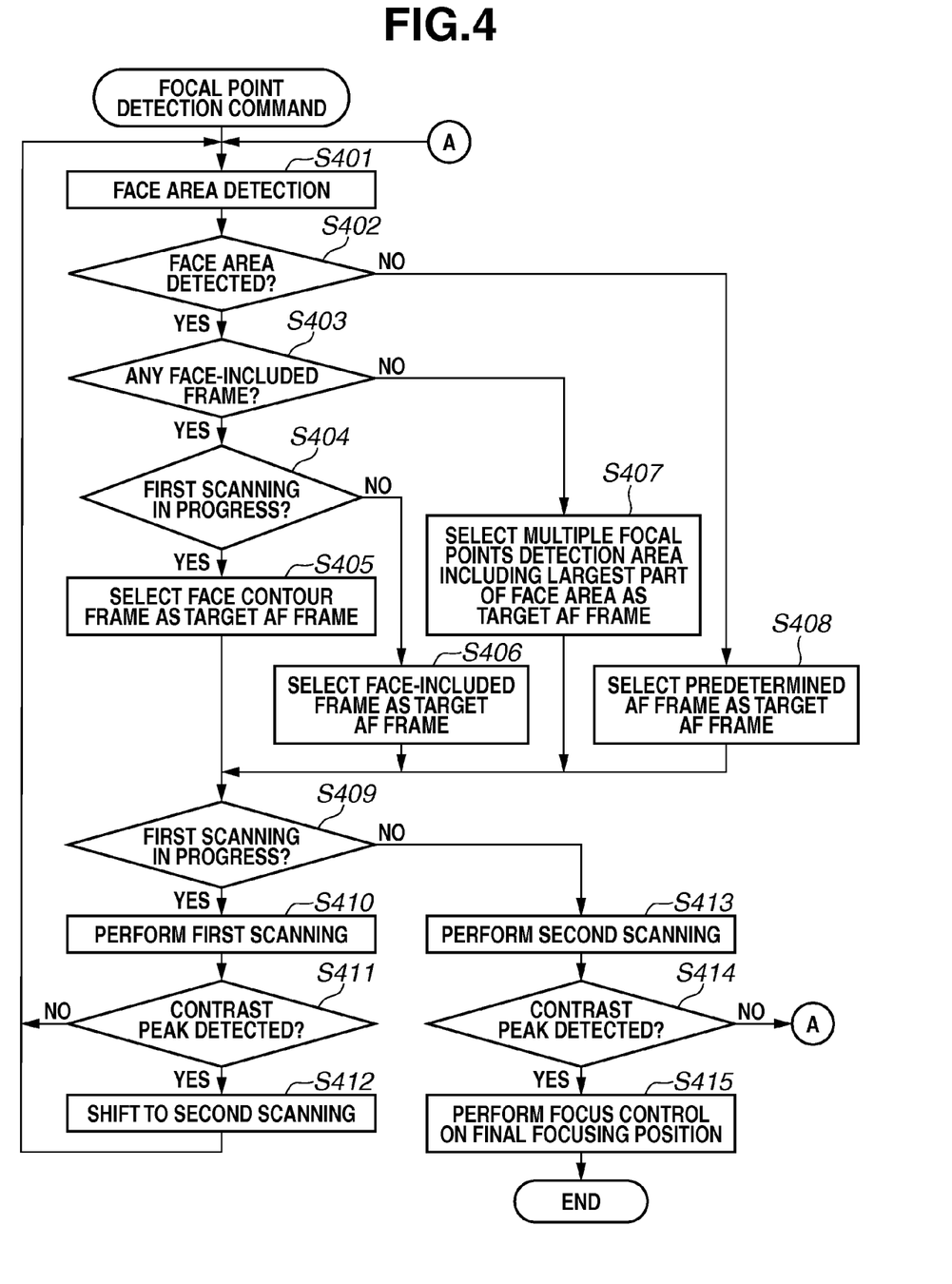
FIG. 4 is a flow chart illustrating an operation according to the first exemplary embodiment.

The following describes the operation according to the present exemplary embodiment, with reference to the flow chart illustrated in FIG. 4. Unless otherwise specified, the system controller 129 performs the following control.

First, the operation is started if the release switch SW1 (132) is operated to generate a focus detection command. It is assumed that the digital camera 100 is turned on in advance. Capturing of images and the live view display are started at about 30 fps to 60 fps in response to the generation of the live view command.

In step S401, the face area detecting block 204 performs face area detection. Following the detection, the process proceeds to step S402.

In step S402, the system controller 129 determines whether a face area is detected in step S401. If a face area is detected (YES in step S402), the process proceeds to step S403. If no face area is detected (NO in step S402), the process proceeds to step S408.

In step S403, the focal point detection area extracting block 202, which is an area setting unit, compares the positional relationship between the face area detected in step S401 and the multiple focal point detection areas (pale halftone dot portions in FIG. 3) to determine whether the face area includes any of the multiple focal point detection areas (hereinafter, the multiple focal point detection areas will be referred to as "face-included frame"). If the face area includes a face-included frame (YES in step S403), the process proceeds to step S404. If the face area includes no face-included frame (NO in step S403), the process proceeds to step S407.

In step S404, the system controller 129 determines a selected driving mode relating to the focus detection operation. The image capturing apparatus according to the present exemplary embodiment includes first scanning and second scanning. The first scanning is a first focus detection process in which a focal position is roughly detected (rough detection) with a large amount of lens driving in the focus detection operation. The second scanning is a second focus detection process in which a focal position is highly precisely detected (precise detection) with a small amount of lens driving. If the driving mode relating to the focus detection is the first scanning, which is the first focus detection process (YES in step S404), the process proceeds to step S405. If the driving mode relating to the focus detection is the second scanning, which is the second focus detection process (NO in step S404), the process proceeds to step S406.

In step S405, among the multiple focal point detection areas (pale halftone dot portions in FIG. 3) including the plurality of focal point detection areas, an area that includes a face contour (hereinafter referred to as "face contour frame") is selected as a multiple focal point detection area that is to be targeted directly in the autofocus control (hereinafter, the multiple focal point detection area will be referred to as "target AF frame"). In FIG. 3, which is a diagram illustrating the focal point detection areas, the focal point detection area 304 or 306 is selected as the face contour frame.

In the first scanning in which the focal position is roughly detected, a face contour frame including a high-contrast subject area such as an ear and hair is targeted. For example, even under a condition that makes the contrast evaluation difficult due to a disturbing factor such as backlight, the autofocus is readily controlled to be performed near the focusing position, making it easy to avoid focus skipping. After the focal point detection area 304 or 306 is selected, the process proceeds to step S409.

In step S406, among the multiple focal point detection areas (pale halftone dot portions in FIG. 3), the face-included frame 305 inside portion of the face contour is selected as the target AF frame. The area that includes no background area is set as a target so that the autofocus control can be performed to accurately focus on the face without perspective conflict. When the face-included frame 305 is selected, the process proceeds to step S409.

If, due to the positional relationship between the face and the multiple focal point detection areas, for example, a boundary of the multiple focal point detection areas lies at a central portion of the face, the process of step S407 is executed. In step S407, the multiple focal point detection areas are disposed such that the face area is divided into right and left portions. Further, the process of step S407 is executed if, due to the shooting distance, the size of the shot face is small and most of the face area is included in one of the multiple focal point detection areas.

Under the foregoing conditions, although the face is detected in step S401, a face-included frame cannot be set. Thus, in step S407, the multiple focal point detection area that includes the largest part of the face area is selected as the target AF frame. By this way, although it is not possible to perform the focus detection targeting on the face contour frame or the face-included frame, which are features of the exemplary embodiment, it becomes possible to perform the focus detection targeting on the face including the contour portion. After selecting the multiple focal point detection area, the process proceeds to step S409.

The process of step S408 is performed if no face is detected and the focus detection is to be performed on an object or the like other than a human object. In step S408, if the foregoing condition is satisfied, all of the nine areas that are constituted of the predetermined three horizontal areas and the predetermined three vertical areas are selected as target AF frames. After the selection, the process proceeds to step S409.

In step S409, as in step S404, the system controller 129 determines a selected state of the driving mode relating to the focus detection operation. If the driving mode relating to the focus detection is the first scanning (YES in step S409), the process proceeds to step S410. If the driving mode relating to the focus detection is the second scanning (NO in step S409), the process proceeds to step S413.

In step S410, the system controller 129 performs control such that the first scanning is performed in which a focal position is roughly detected (rough detection) with a large lens drive movement. After the control is carried out, the process proceeds to step S411.

In step S411, the system controller 129 determines whether a contrast peak is detected during the scanning. If a contrast peak is detected (YES in step S411), the process proceeds to step S412. In step S412, the driving mode relating to the focus detection is shifted to the second scanning in which a focal position is highly precisely detected with a small lens drive movement. After the shifting is performed, the process returns to step S401. If no contrast peak is detected (NO in step S411), the process also returns to step S401.

In step S413, the system controller 129 performs control such that the second scanning is performed. After the control is performed, the process proceeds to step S413.

In step S414, as in step S411, the system controller 129 determines whether a contrast peak is detected during the scanning. If no contrast peak is detected (NO in step S414), the process returns to step S401. If a contrast peak is detected, the process proceeds to step S415. In step S415, the focus control is performed such that the position of the contrast peak becomes a final focusing position. Then, the operation according to the present exemplary embodiment ends.

The foregoing operation is performed so that in the focus detection (autofocus) according to a contrast evaluation method, when a face exists, the face can be targeted while focus determination at a wrong focusing position is avoided, or focusing fails and becomes impossible, enabling high-precision focus detection.

Modified Example

The present exemplary embodiment describes the focal point detection areas 304 and 306 in FIG. 3 as examples of the face contour portion. However, the focal point detection areas are not limited to the focal point detection areas 304 and 306. The focal point detection areas can be multiple focal point detection areas including a plurality of focal point detection areas that correspond to a contour portion obtained from a detection result of any other subject detection method, such as head and neck portions of a human object that can be identified from the face area, and a trunk portion obtained based on a publicly-known human body detection. The foregoing configuration facilitates the rough focus control toward an area near the focusing position using a high-contrast contour portion, as in the exemplary embodiment.

That is to say, a contour of a subject can be a contour of at least one body site of the subject, and a portion inside the contour of the subject can be a portion inside the contour of the body site.

In the first exemplary embodiment, the image capturing apparatus includes the first scanning in which a focal position is roughly detected with a large amount of lens drive movement at the time of the focus detection and the second scanning in which a focal position is highly precisely detected with a small amount of lens drive movement, such that the driving mode relating to the focus detection is switched between the first scanning and the second scanning.

However, a detection method is not limited to the above example. The image capturing apparatus can be configured such that the scanning speed is changed based on a speed control index of the focus lens relating to the contrast evaluation value of a subject so that the focal position detection is switched between rough detection and high-precision detection. The operation according to the second exemplary embodiment will be described below. The configuration of the digital camera 100 is similar to that in the first exemplary embodiment.

The following describes the driving relating to the focus detection according to the second exemplary embodiment.

Figure 5:
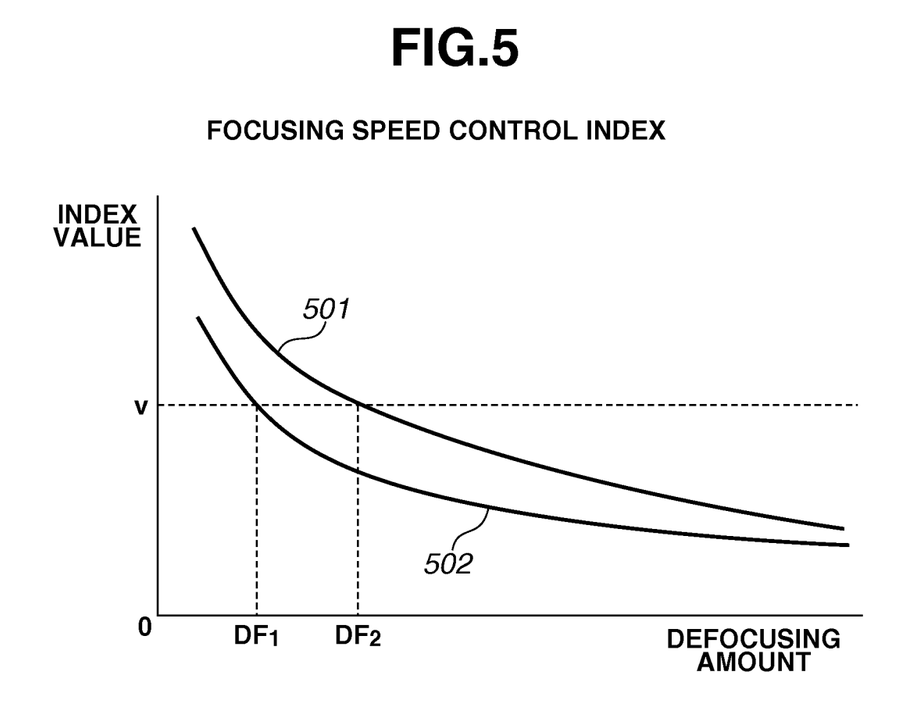
FIG. 5 is a graph illustrating speed control index values of a focus lens.

FIG. 5 is a graph illustrating the speed control index value of the focus lens that relates to the contrast evaluation value of a subject.

In FIG. 5, the speed control index value of the focus lens is obtained through normalization of the first contrast evaluation value with the second contrast evaluation value.

The first contrast evaluation value is obtained by extracting a predetermined spatial frequency component from an image signal through digital filter calculation.

The second contrast evaluation value is obtained through calculation of a difference between the highest and lowest values of a luminance signal generated using the image signal.

The speed control index value of the focus lens has as its characteristic tolerance to the negative effect caused by variance of the luminance level of a subject depending on the focus movement. The speed control index value increases as an amount of defocusing of the subject becomes smaller.

The speed of autofocus control, in other words, the driving speed of the focus lens 101 is caused to change according to whether the speed control index value is larger than a speed control threshold value v of the focus lens. Thus, the speed can be controlled such that the contrast scanning is performed at low speed only in an area near the focusing position. This can reduce operation time while the precision of focus detection is maintained.

In FIG. 5, curves 501 and 502 show examples of the speed control index value of the focus lens with respect to subjects having different spatial frequency characteristics. The curve 501 shows an example of the index in the case in which spatial frequency characteristic of a subject includes many predetermined spatial frequency domains targeted by the contrast evaluation value calculating block 203. The curve 502 shows an example of the index in the case in which spatial frequency characteristic of a subject does not include many predetermined spatial frequency domains targeted by the contrast evaluation value calculating block 203, e.g., a subject that tends to have specific spatial frequency characteristics.

A face contour portion that includes body sites of various spatial frequencies such as ears and hair is likely to have the characteristic shown by the curve 501. On the other hand, a face-included frame that includes body sites of slightly higher frequency components such as eyebrows and eyes, and body sites of significantly low-frequency components such as a nose and cheeks and thus includes a few sites of intermediate frequency components is likely to have the characteristic shown by the curve 502.

With respect to the speed control threshold value v of the focus lens that is provided in the digital camera 100, the curve 501 starts to change the speed at DF1 close to an area near the focusing position, whereas the curve 502 starts to change the speed at DF2, which is in the direction of defocusing. If the autofocus control is performed at high speed up to a position that is very close to an in-focus position, the focusing position is more likely to be skipped. Hence, the speed of the autofocus control is desirably decreased to be appropriate just before the in-focus position according to the speed of image-plane movement at which high-speed autofocus control is performed.

Accordingly, to roughly detect a focal position, it is desirable to perform the focal point detection in a short period of time by performing high-speed autofocus control. Thus, it is suitable to target a face contour portion in the focal point detection. On the other hand, to highly precisely detect a focal position, it is desirable to perform the focus detection by performing low-speed autofocus control. Thus, it is suitable to target on a face-included frame in the focal point detection.

Hence, according to the present exemplary embodiment, in the case of focusing in which the focusing speed control value is equal to or smaller than the threshold value v, the face contour portion is targeted, and the focal point detection is roughly performed for a short period of time with high-speed autofocus control. On the other hand, in the case of focusing in which the focusing speed control value is larger than the threshold value v, the face-included frame is targeted, and the focus detection is highly precisely performed by performing low-speed autofocus control.

Figure 6:
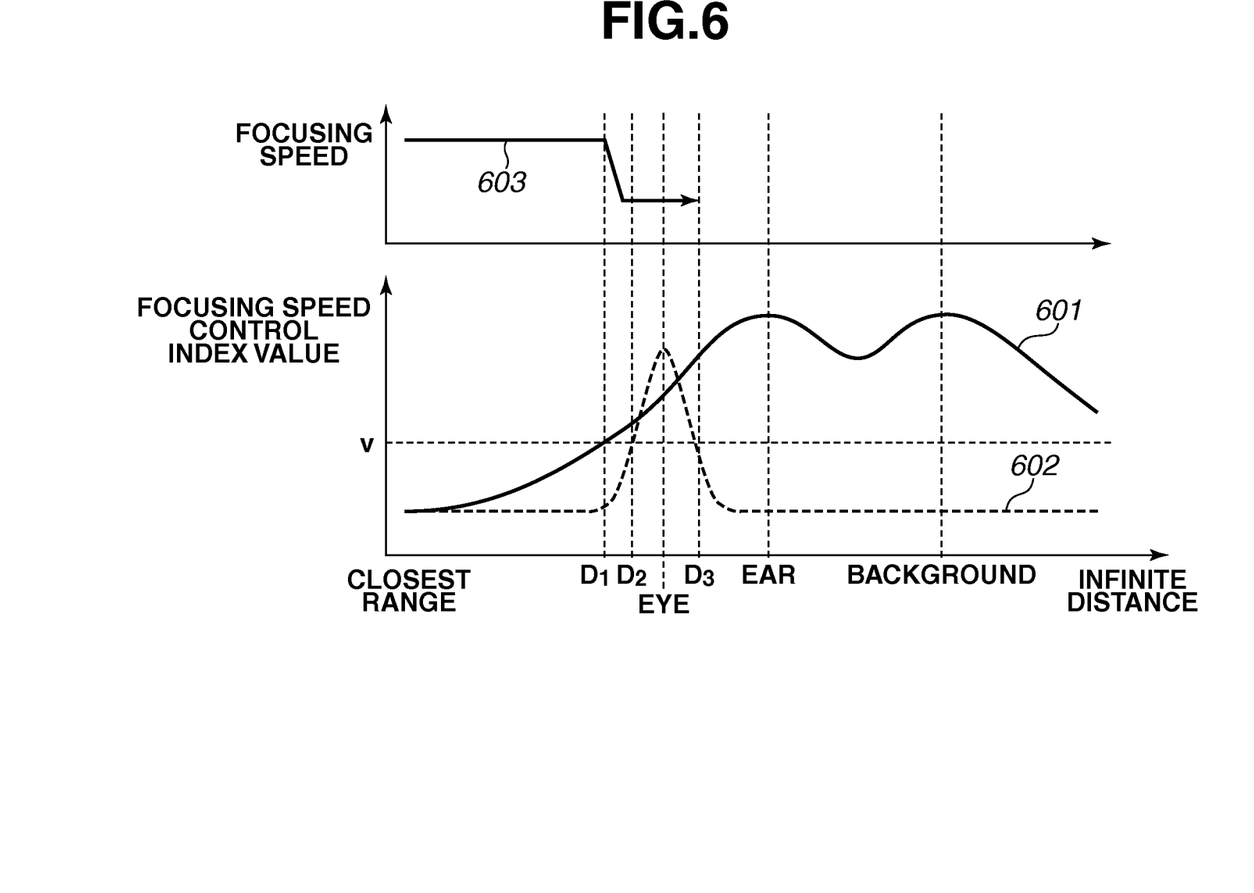
FIG. 6 is a graph illustrating an operation of controlling the speed of a focus lens according to a speed control index value of the focus lens.

FIG. 6 is a graph illustrating the operation of changing the speed of autofocus control based on the speed control index value of the focus lens that is described above. In FIG. 6, the horizontal axis represents the focusing range from a closest distance to an infinite distance, and the vertical axis represents the focusing speed and the speed control index value of the focus lens. A curve 601 shows how the speed control index value of the focus lens changes in the face contour frame. A curve 602 shows how the speed control index value of the focus lens changes in the face-included frame.

The curve 601 shows that the face and the background have a perspective conflict and the speed control index value of the focus lens is high at the ear and the background. Further, since the subject has a relatively high contrast, the level of the speed control index value of the focus lens is high, and the full width at half maximum of the peak waveform is broad.

On the other hand, the curve 602 shows that the speed control index value of the focus lens is high at the eye focusing position. Further, since the area of the subject having a relatively high contrast is small, the level of the speed control index value of the focus lens is low. A line 603 shows the control of the driving speed of the focus lens when the focus lens has such speed control index values. At a focusing position D1, with respect to the face contour portion, the speed control index value of the focus lens exceeds the threshold value v, and the speed is decreased. The focus lens passes the eye focusing position while the focusing speed is low, whereby a contrast peak that is not illustrated can be detected highly precisely.

After the detection of the contrast peak, the control of the focus lens 101 is stopped at a focusing position D3 to switch to the driving of the lens toward a focusing position. For example, when the target AF frame is the face-included frame, the speed control index value of the focus lens has a significantly narrow full width at half maximum as shown by the curve 602. Thus, when the focusing speed is changed to low speed, the focusing position is already close to the eye focusing position as shown by a focusing position D2, making it impossible to perform high-precision contrast evaluation.

Figure 7:
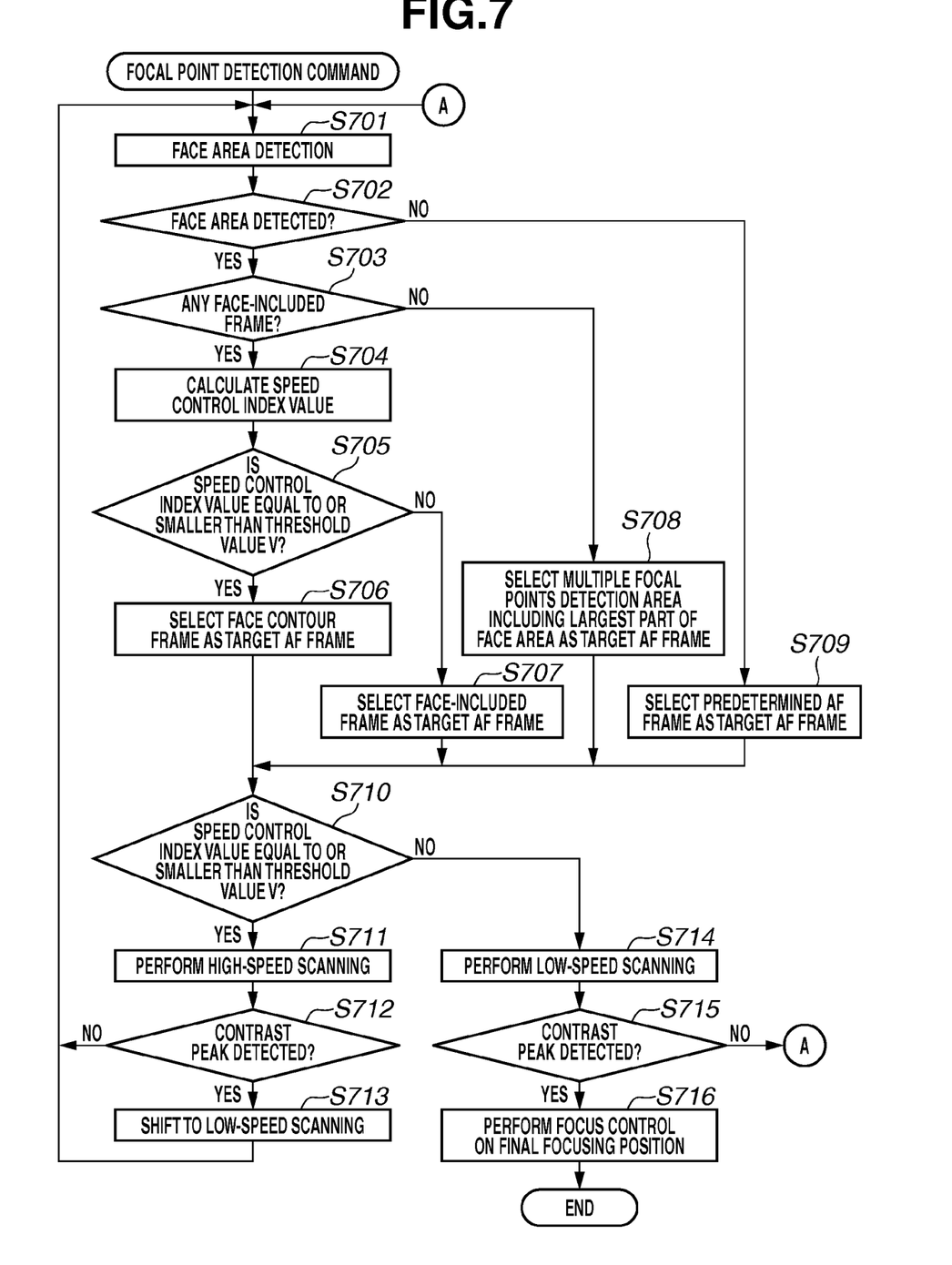
FIG. 7 is a flow chart illustrating an operation according to a second exemplary embodiment.

The following describes the operation according to the second exemplary embodiment, with reference to the flow chart illustrated in FIG. 7. Unless otherwise specified, the system controller 129 performs the following control.

First, the release switch SW1 (132) is turned on to generate a focus detection command and the operation is started. It is assumed that the digital camera 100 is turned on in advance. capturing of images at about 30 fps to 60 fps and the live view display start when a live view command is issued.

In step S701, the face area detecting block 204 performs face area detection. Following the detection, the process proceeds to step S702.

In step S702, the system controller 129 determines whether a face area is detected in step S701. If a face area is detected (YES in step S702), the process proceeds to step S703. If no face area is detected (NO in step S702), the process proceeds to step S709.

In step S703, the system controller 129 compares the positional relationship between the face area detected in step S701 and the multiple focal point detection areas (pale halftone dot portions in FIG. 3) to determine whether the face area includes a face-included frame, which is a multiple focal point detection area. If the face area includes a face-included frame (YES in step S703), the process proceeds to step S704. If the face area includes no face-included frame (NO in step S703), the process proceeds to step S708.

In step S704, the system controller 129 calculates the speed control index value of the focus lens, which is a feature of the present exemplary embodiment. In step S705, the system controller 129 determines whether the speed control index value is equal to or smaller than a predetermined threshold value v. If the speed control index value is equal to or smaller than the threshold value v (YES in step S705), the process proceeds to step S706. If the speed control index value is larger than (exceeds) the threshold value v, the process proceeds to step S707.

In step S706, among the multiple focal point detection areas (pale halftone dot portions in FIG. 3), a face contour frame that includes a face contour is selected as a target AF frame. The target AF frame is a multiple focal point detection area to be targeted directly in the focus control. After the selection of the face contour frame, the process proceeds to step S710.

In step S707, among the multiple focal point detection areas (pale halftone dot portions in FIG. 3), the face-included frame 305 inside the face contour is selected as a target AF frame. Following the selection, the process proceeds to step S710.

In step S708, although the face is detected in step S701, since a face-included frame cannot be set due to the positional relationship between the face and the multiple focal point detection areas, the multiple focal point detection area that includes the largest part of the face area is selected as a target AF frame. Following the selection, the process proceeds to step S710.

The process of step S709 is performed if no face is detected and the focus detection is to be performed on an object or the like other than a human object. In this case, in step S709, all of the nine areas that are constituted of the predetermined three horizontal areas and the predetermined three vertical areas are selected as target AF frames. Following the selection, the process proceeds to step S710.

In step S710, the system controller 129 calculates the speed control index value of the focus lens again and then compares the speed control index of the focus lens to the threshold value v. If the speed control index is equal to or smaller than the threshold value v (YES in step S710), the process proceeds to step S711. If the speed control index is larger than the threshold value v, the process proceeds to step S714.

In step S711, the system controller 129 performs control such that high-speed scanning is carried out in which the focal position is roughly detected with high-speed lens driving. After the control is performed, the process proceeds to step S712.

In step S712, the system controller 129 determines whether a contrast peak is detected during the high-speed scanning without a decrease in the driving speed of the focus lens. If a contrast peak is detected (YES in step S712), the process proceeds to step S713. In step S713, the high-speed scanning is switched to the low-speed scanning in which the focal position is highly precisely detected with low-speed lens driving. After the switching to the low-speed scanning, the process returns to step S701. If no contrast peak is detected, the process also returns to step S701.

In step S714, the system controller 129 performs control such that the low-speed scanning is carried out. After the control is performed, the process proceeds to step S715.

In step S715, the system controller 129 determines whether a contrast peak is detected during the low-speed scanning. If no contrast peak is detected (NO in step S715), the process returns to step S701. If a contrast peak is detected (YES in step S715), the process proceeds to step S716. In step S716, the focus control is performed such that the position of the contrast peak is set as a final focusing position. Then, the operation according to the present exemplary embodiment ends.

The foregoing operation is performed so that high-precision focal point detection can be performed while the time required to detect a focal point is reduced. Furthermore, when a face exists, the face can be targeted while focus determination at a wrong focusing position or a focusing failure are avoided, enabling high-precision focus detection.

In the first exemplary embodiment, the face contour frame and the face-included frame are selected from the multiple focal point detection areas arranged in the lattice-like pattern. However, the face contour frame and the face-included frame are not limited to those described in the first exemplary embodiment. The face contour frame and the face-included frame can be set as an area having an arbitrary size. The configuration according to the third exemplary embodiment will be described below. The configuration of the digital camera 100 is similar to that in the first exemplary embodiment.

Figure 8:
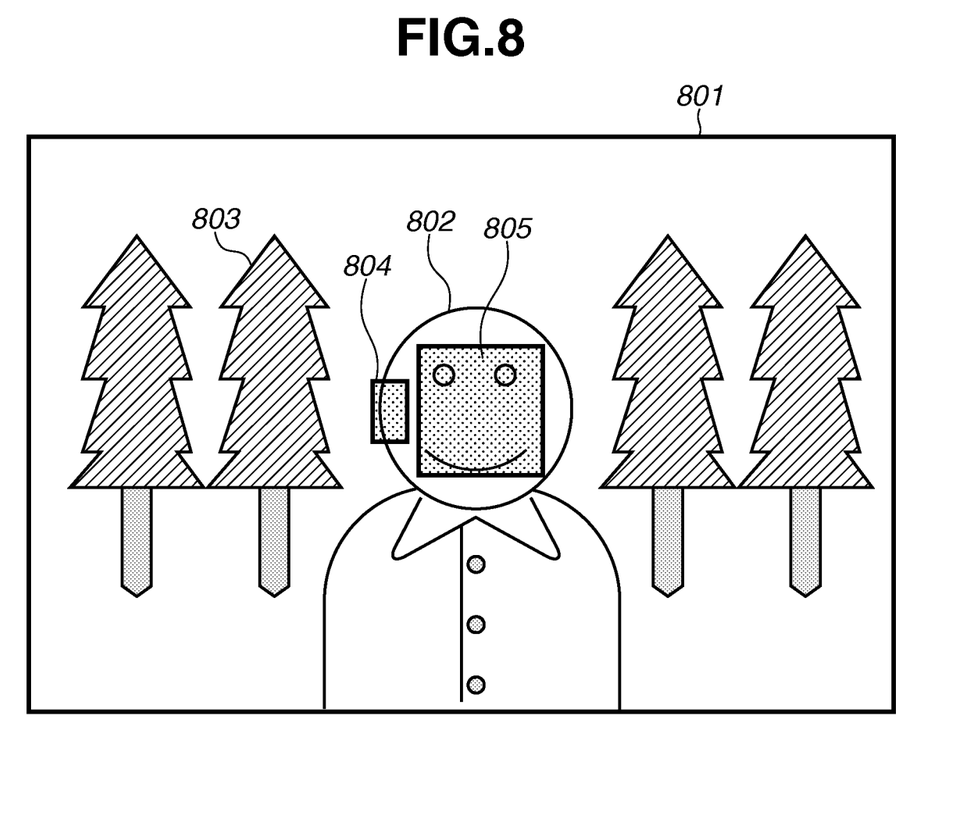
FIG. 8 is a diagram illustrating focal point detection areas according to a third exemplary embodiment.

The following describes focal point detection areas according to the third exemplary embodiment.

FIG. 8 is a diagram illustrating a face contour frame and a face-included frame that are set in arbitrary size. In FIG. 8, a shooting composition 801 includes a human object 802, which is a main subject, background trees 803, a face contour frame 804, which is set as an area having an arbitrary size, and a face-included frame 805, which is also set as an area having an arbitrary size.

A focal point detection area of the face contour frame 804 is set in the form of a rectangle based on face area information obtained by face detection. The longitudinal side of the rectangle is set in a direction along the face contour. The shorter-side of the rectangle is set as narrowly as possible to avoid a perspective conflict with the background. A focal point detection area of the face-included frame 805 is set inside the face contour based on the face area information obtained by the face detection.

Since the face-included frame includes only few high-contrast sites, the focal point detection area is set as largely as possible to pick up as many contrast components as possible to an extent that the focal point detection area does not include the face contour. In such a configuration, the face contour frame 804 is set to have a smaller area than the area of the face-included frame 805.

Figure 9:
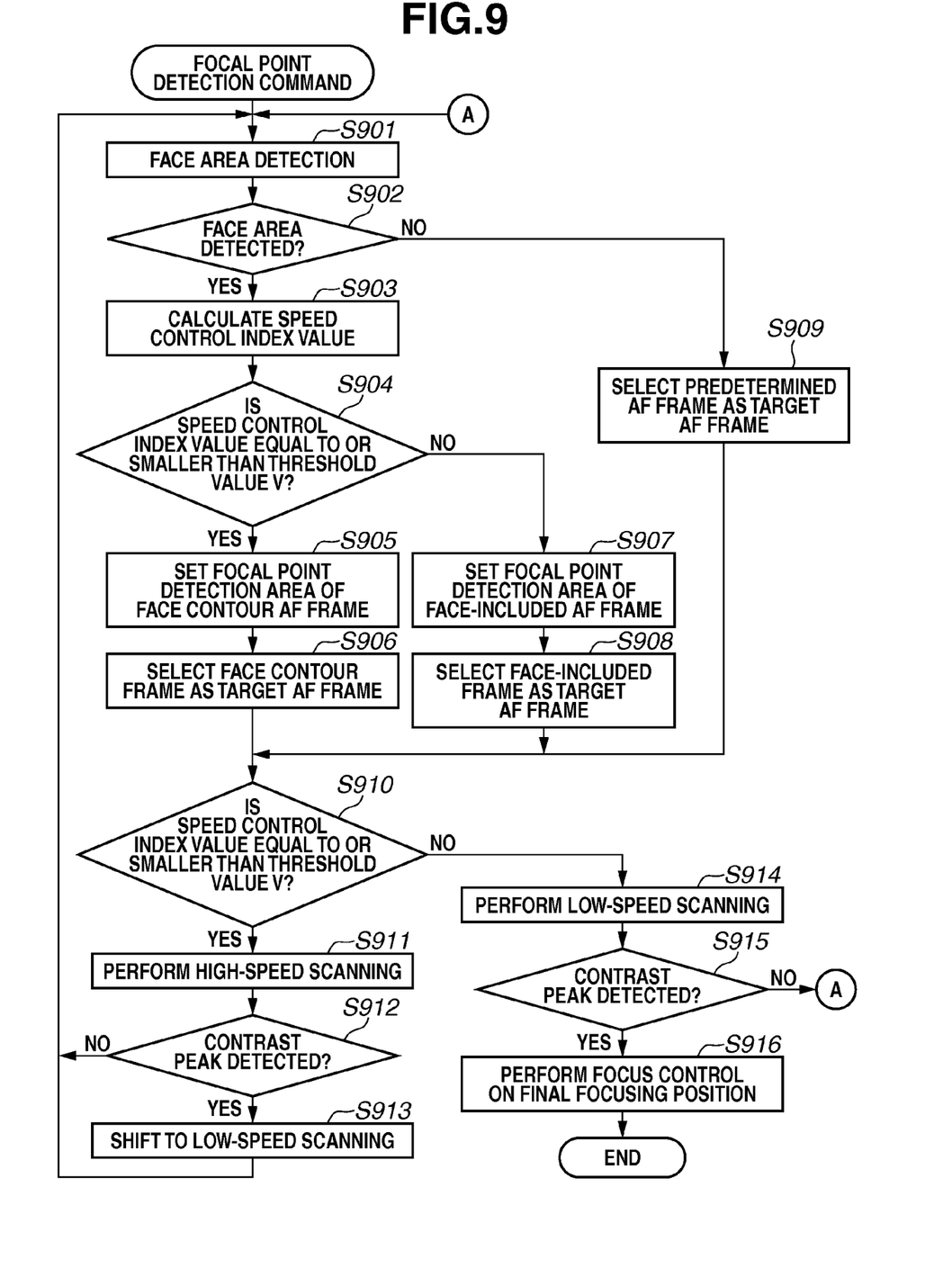
FIG. 9 is a flow chart illustrating an operation according to the third exemplary embodiment.

The following describes the operation according to the third exemplary embodiment, with reference to the flow chart illustrated in FIG. 9. Unless otherwise specified, the system controller 129 performs the following control.

First, the operation is started when the release switch SW1 (132) is operated to generate a focus detection command. It is assumed that the digital camera 100 is turned on in advance. The digital camera 100 starts capturing images at about 30 fps to 60 fps and the live view display in response to the live view command.

In step S901, the face area detecting block 204 performs face area detection. After the detection of the face area, the process proceeds to step S902.

In step S902, the system controller 129 determines whether a face area is detected in step S901. If a face area is detected (YES in step S902), the process proceeds to step S903. If no face area is detected (NO in step S402), the process proceeds to step S909.

In step S903, the system controller 129 calculates the speed control index value of the focus lens. In step S904, the system controller 129 compares the speed control index value to a predetermined threshold value v to determine whether the speed control index value is equal to or smaller than the predetermined threshold value v. If the speed control index value is equal to or smaller than the threshold value v (YES in step S904), the process proceeds to step S905. If the speed control index value is larger than (exceeds) the threshold value v, the process proceeds to step S907.

In step S905, based on the detected face area, a focal point detection area of a face contour AF frame is set to be long in the direction of the face contour line and short in the direction perpendicular to the direction of the face contour line. Desirably, the length of the focal point detection area is long in the direction of the face contour line to include at least an area from ears to cheeks. It is desirable that the length in the direction perpendicular to the face contour line barely embraces the ears with little inclusion of the background. In such an area setting, the focal point detection area includes many high-contrast face contour sites while a perspective conflict with the background is avoided. This can reduce skipping of a focusing position. After the setting is made, the process proceeds to step S906.

In step S906, the face contour AF frame set in step S905 is set as a target AF frame. After the setting is made, the process proceeds to step S910.

In step S907, based on the detected face area, a focal point detection area of the face-included AF frame is set inside the face contour as large as possible. Since the face-included portion includes only few high-contrast sites, the focal point detection area is set as large as possible to pick up more contrasts. In such an area setting, high-precision focal point detection can be performed while skipping of a focusing position is reduced. After the setting is made, the process proceeds to step S908.

In step S908, the face-included AF frame set in step S907 is set as a target AF frame. Following the setting, the process proceeds to step S910.

The process of step S909 is performed when no face is detected and the focus detection is to be performed on an object or the like other than a human object. In the above situation, all of the nine areas that are constituted of the predetermined three horizontal areas and the predetermined three vertical areas are selected as target AF frames as in step S709 in the second exemplary embodiment. After the selection is made, the process proceeds to step S910.

In step S910, the system controller 129 compares the speed control index value of the focus lens to the threshold value v again to determine whether the speed control index value is equal to or smaller than the threshold value v. If the speed control index value is equal to or smaller than the threshold value v (YES in step S910), the process proceeds to step S911. If the speed control index value is larger than the threshold value v (NO in step S910), the process proceeds to step S914.

In step S911, the system controller 129 performs control such that high-speed scanning is performed in which the focal position is roughly detected with high-speed lens driving. After the control is performed, the process proceeds to speed control index value step S912.

In step S912, the system controller 129 determines whether a contrast peak is detected during the high-speed scanning without a decrease in the driving speed of the focus lens. If a contrast peak is detected (YES in step S912), the process proceeds to step S913. In step S913, the high-speed scanning is switched to the low-speed scanning in which the focal position is highly precisely detected with low-speed lens driving. Following the switching, the process returns to step S901. If no contrast peak is detected, the process also returns to step S901.

In step S914, the system controller 129 performs control such that the low-speed scanning is carried out. After the control is performed, the process proceeds to step S915.

In step S915, the system controller 129 determines whether a contrast peak is detected during the low-speed scanning. If no contrast peak is detected (NO in step S915), the process returns to step S901. If a contrast peak is detected (YES in step S915), the process proceeds to step S916. In step S916, the focus control is performed such that the position of the contrast peak is set as a final focusing position. Then, the operation according to the present exemplary embodiment ends.

The foregoing operation is performed so that when the focal point detection is roughly carried out using the face contour AF frame, the effect of perspective conflict can be reduced. Further, when the high-precision focal point detection is performed using the face-included AF frame, the contrast evaluation is more likely to be performed precisely even under negative conditions such as backlight and overexposure/underexposure.

Modified Example

In the present exemplary embodiment, the area from the ears to the cheeks is the face contour portion and is set as the face contour AF frame. However, the focal point detection areas are not limited to those set in the present exemplary embodiment. The focal point detection areas can be detection areas that correspond to a contour portion obtained from a result of any other subject detection method, such as head and neck portions of a human object or a trunk portion based on a result of publicly-known human body detection.

In other words, a contour of a subject may be a contour of at least one body site of the subject, and a portion inside the contour of the subject may be a portion inside the contour of the body site.

In this case, the longitudinal direction and the shorter-side direction may switch their places when compared to the above descriptions in steps S905 and S907, but this would not be a problem. The foregoing configuration makes it easy to perform rough focus control on an area near the focusing position using a high-contrast contour portion, as in an exemplary embodiment.

Other Embodiments

Embodiments of the disclosure can also be realized by a computer of a system or apparatus that reads out and executes computer executable instructions recorded on a storage medium (e.g., non-transitory computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2013-122102 filed Jun. 10, 2013, which is hereby incorporated by reference herein in its entirety.

What is claimed is:

1. An image capturing apparatus comprising:
a focal point adjusting unit configured to perform focal point adjustment based on a contrast evaluation value of a subject generated using an image signal output from an image sensor;
a first area setting unit configured to set a first focal point detection area including a contour portion of the subject for use in focal point detection by use of the image signal output from the image sensor; and
a second area setting unit configured to set a second focal point detection area including a portion inside a contour of the subject and excluding the contour portion,
wherein the focal point adjusting unit includes a mode in which after a first focal point adjustment process is carried out based on a contrast evaluation value of the first focal point detection area, a second focal point adjustment process is carried out based on a contrast evaluation value of the second focal point detection area, and
wherein an amount of step drive of a focus lens in the second focal point adjustment process is smaller than an amount of step drive of the focus lens in the first focal point adjustment process.

2. An image capturing apparatus comprising:
a focal point adjusting unit configured to perform focal point adjustment based on a contrast evaluation value of a subject generated using an image signal output from an image sensor;
a first area setting unit configured to set a first focal point detection area including a contour portion of the subject for use in focal point detection by use of the image signal output from the image sensor; and
a second area setting unit configured to set a second focal point detection area including a portion inside a contour of the subject and excluding the contour portion,
wherein the focal point adjusting unit includes a mode in which after a first focal point adjustment process is carried out based on a contrast evaluation value of the first focal point detection area, a second focal point adjustment process is carried out based on a contrast evaluation value of the second focal point detection area, and
wherein a driving speed of a focus lens in the second focal point adjustment process is lower than a driving speed of the focus lens in the first focal point adjustment process.

3. An image capturing apparatus comprising:
a focal point adjusting unit configured to perform focal point adjustment based on a contrast evaluation value of a subject generated using an image signal output from an image sensor;
a first area setting unit configured to set a first focal point detection area including a contour portion of the subject for use in focal point detection by use of the image signal output from the image sensor; and
a second area setting unit configured to set a second focal point detection area including a portion inside a contour of the subject and excluding the contour portion,
wherein the focal point adjusting unit includes a mode in which after a first focal point adjustment process is carried out based on a contrast evaluation value of the first focal point detection area, a second focal point adjustment process is carried out based on a contrast evaluation value of the second focal point detection area, and
wherein the first focal point detection area is smaller than the second focal point detection area.

4. The image capturing apparatus according to claim 1, wherein each of the first focal point detection area and the second focal point detection area is selected from a plurality of focal point detection areas arranged in advance in a lattice-like pattern.

5. An image capturing apparatus comprising:
a focal point adjusting unit configured to perform focal point adjustment based on a contrast evaluation value of a subject generated using an image signal output from an image sensor;
a first area setting unit configured to set a first focal point detection area including a contour portion of the subject for use in focal point detection by use of the image signal output from the image sensor; and
a second area setting unit configured to set a second focal point detection area including a portion inside a contour of the subject and excluding the contour portion,
wherein the focal point adjusting unit includes a mode in which after a first focal point adjustment process is carried out based on a contrast evaluation value of the first focal point detection area, a second focal point adjustment process is carried out based on a contrast evaluation value of the second focal point detection area, and
wherein if an index value for changing a driving speed of a focus lens that is calculated using the image signal is larger than a predetermined threshold value, the first focal point adjustment process is switched to the second focal point adjustment process.

6. The image capturing apparatus according to claim 1, wherein the contour of the subject is a contour of a face of the subject, and the portion inside the contour of the subject is a portion inside the contour of the face.

7. The image capturing apparatus according to claim 1, wherein the contour of the subject is a contour of at least one body site, and the portion inside the contour of the subject is a portion inside the contour of the body site.

8. An image capturing method comprising:
performing focal point adjustment based on a contrast evaluation value of a subject generated using an image signal output from an image sensor;
first area setting to set a first focal point detection area including a contour portion of the subject for use in focal point detection by use of the image signal output from the image sensor; and
second area setting to set a second focal point detection area including a portion inside a contour of the subject and excluding the contour portion, wherein the focal point adjusting unit includes a mode in which after a first focal point adjustment process is carried out based on a contrast evaluation value of the first focal point detection area, a second focal point adjustment process is carried out based on a contrast evaluation value of the second focal point detection area, and wherein an amount of step drive of a focus lens in the second focal point adjustment process is smaller than an amount of step drive of the focus lens in the first focal point adjustment process.

9. An image capturing method comprising:

performing focal point adjustment based on a contrast evaluation value of a subject generated using an image signal output from an image sensor;

first area setting to set a first focal point detection area including a contour portion of the subject for use in focal point detection by use of the image signal output from the image sensor; and second area setting to set a second focal point detection area including a portion inside a contour of the subject and excluding the contour portion, wherein the focal point adjusting unit includes a mode in which after a first focal point adjustment process is carried out based on a contrast evaluation value of the first focal point detection area, a second focal point adjustment process is carried out based on a contrast evaluation value of the second focal point detection area, and wherein a driving speed of a focus lens in the second focal point adjustment process is lower than a driving speed of the focus lens in the first focal point adjustment process.

10. An image capturing method comprising:

performing focal point adjustment based on a contrast evaluation value of a subject generated using an image signal output from an image sensor;

first area setting to set a first focal point detection area including a contour portion of the subject for use in focal point detection by use of the image signal output from the image sensor; and second area setting to set a second focal point detection area including a portion inside a contour of the subject and excluding the contour portion, wherein the focal point adjusting unit includes a mode in which after a first focal point adjustment process is carried out based on a contrast evaluation value of the first focal point detection area, a second focal point adjustment process is carried out based on a contrast evaluation value of the second focal point detection area, and wherein the first focal point detection area is smaller than the second focal point detection area.

11. An image capturing method comprising:

performing focal point adjustment based on a contrast evaluation value of a subject generated using an image signal output from an image sensor;

first area setting to set a first focal point detection area including a contour portion of the subject for use in focal point detection by use of the image signal output from the image sensor; and second area setting to set a second focal point detection area including a portion inside a contour of the subject and excluding the contour portion, wherein the focal point adjusting unit includes a mode in which after a first focal point adjustment process is carried out based on a contrast evaluation value of the first focal point detection area, a second focal point adjustment process is carried out based on a contrast evaluation value of the second focal point detection area, and wherein if an index value for changing a driving speed of a focus lens that is calculated using the image signal is larger than a predetermined threshold value, the first focal point adjustment process is switched to the second focal point adjustment process.

* * * * *